(No Model.)
F. G. SACKET.
MEANS FOR PROTECTING OIL TANKS FROM LIGHTNING.
No. 258,130. Patented May 16, 1882.
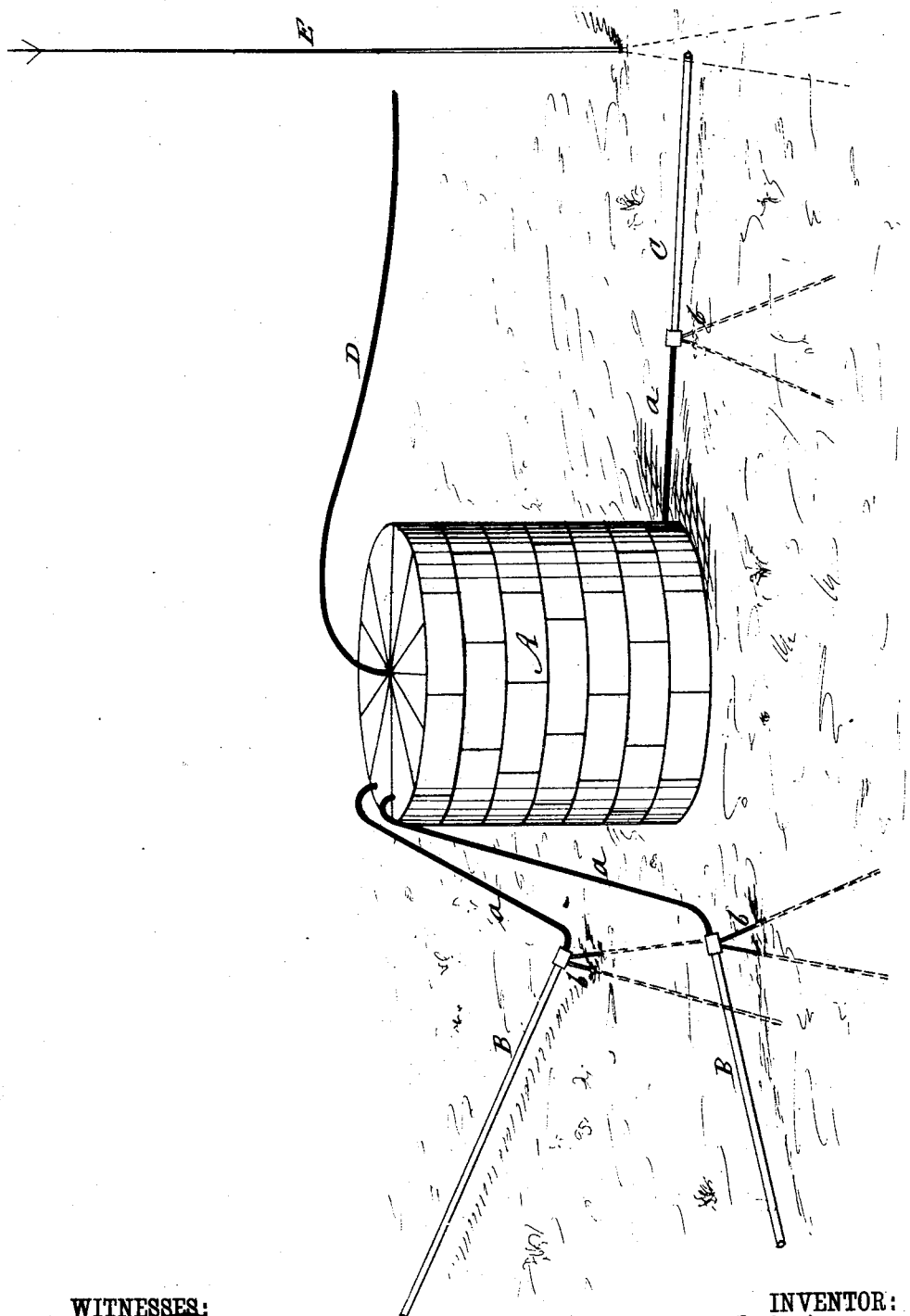
WITNESSES:
C. Neveux
C. Sedgwick
INVENTOR:
F. G. Sacket,
BY Munn & Co
ATTORNEYS.

UNITED STATES PATENT OFFICE.

FREDERIC G. SACKET, OF KNOX, PENNSYLVANIA.

MEANS FOR PROTECTING OIL-TANKS FROM LIGHTNING.

SPECIFICATION forming part of Letters Patent No. 258,130, dated May 16, 1882.

Application filed August 5, 1880. (No model.)

*To all whom it may concern:*

Be it known that I, FREDERIC G. SACKET, of Knox, in the county of Clarion and State of Pennsylvania, have invented a new and Improved Means for Protecting Oil-Tanks from Lightning, of which the following is a specification.

Various theories have been advanced to account for the firing of oil-tanks by lightning. The theory which I believe to be correct is as follows: The tanks are supplied and discharged by pipe-lines extending long distances, wholly or partially under ground, and terminating within the upper part of the tank. During the prevalence of a thunder-storm the pipes become charged with electricity by induction, and the tanks being highest, the electricity accumulates in the tanks and the pipes immediately around them. When the static condition of the pipe is disturbed by the passage of a current between the pipe and clouds the sudden discharge fires the oil by creating a spark or production of heat.

The object of my invention is to provide for accumulation and discharge of electricity without effect upon the tanks; and the invention consists in providing the pipe-lines with electrical conductors for carrying off the electicity, as more particularly hereinafter set forth.

My invention is illustrated by the accompanying drawing, wherein the protecting devices are shown as applied to a tank.

A is the tank, of usual character, such as is used for receiving oil, which tanks are usually made of iron plates riveted together; but the tank may be made of wood.

B B are the pipe-lines for supplying oil to the tank, and C the pipe-line for discharging oil from the tank.

A short distance from the tank A, as far as may be required, the iron pipes terminate, and are connected with the tank by pipes *a*, of wood or other non-conducting material. From the end of the iron pipes electrical conductors *b* pass to the ground, and are connected with a ground-plate, or otherwise placed to make good connection with the ground. These conductors should be of ample capacity. By this arrangement the tank is insulated from the pipe-lines, and electricity conveyed by the pipes will not pass to the tanks.

D is the vent-pipe for gas, which is connected at the top of tank A, and extends away from the same for discharge of the gas at a suitably-distant point. This pipe D is of electrically non-conducting material.

Either of the devices named can be used separately, and will be arranged as required by circumstances. For instance, there may be a supply-pipe without a discharge-pipe. The pipe-lines may run partially or wholly under ground, and may be a single long line or numerous short lines. The insulation of the tank can be effected by placing the sections of electrically non-conducting material at the tank or at any desired point in the lines.

I am aware that it is not new to provide the vent-tube of an oil-tank with a non-conducting section, and I therefore do not claim broadly the pipes of an oil-tank provided with non-conducting sections; but

What I claim, and desire to secure by Letters Patent, is—

As a means for protecting oil-tanks from the effects of lightning, a pipe for conveying the oil into the tank, insulated at a point near the tank, and provided with a suitable conductor or conductors, whereby the electric fluid is arrested and conveyed away, substantially as shown and described.

F. G. SACKET.

Witnesses:
  M. E. HESS,
  HENRY BARNHART.